Patented Oct. 13, 1953

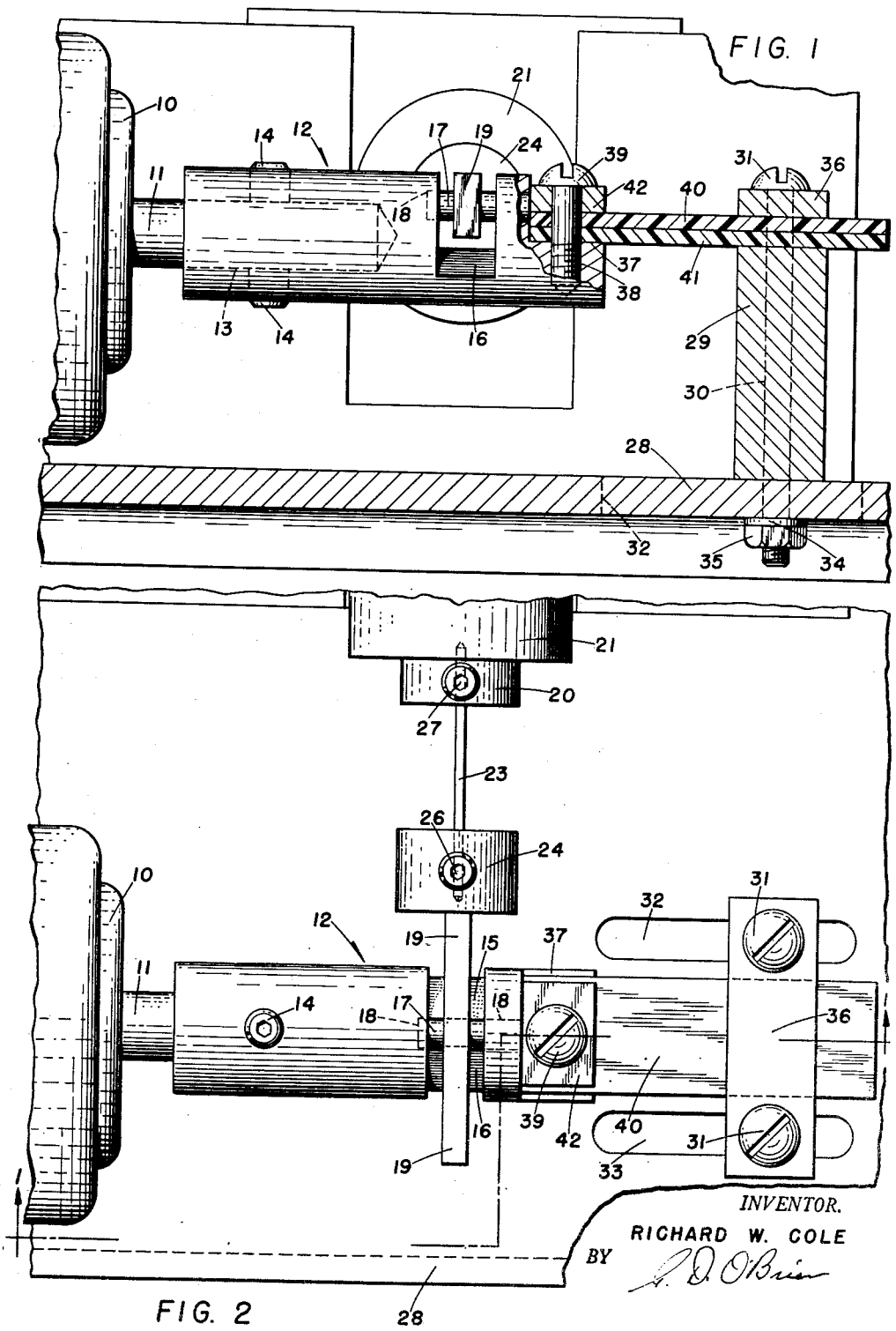

2,655,049

UNITED STATES PATENT OFFICE 2,655,049

MECHANICAL OSCILLATION DAMPER

Richard W. Cole, Silver Spring, Md., assignor to the United States of America as represented by the Secretary of the Navy Application September 2, 1949, Serial No. 113,887

2 Claims. (Cl. 74—99)

The present invention relates broadly to mechanical-oscillation damping means and more particularly to means for damping the oscillations of hydraulic valves. Still more specifically, it relates to means for damping the oscillation of a rocking shaft that operates the reciprocating stem of a sensitive hydraulic valve, such as is used in many control devices for guided missiles.

One of the major problems encountered in designing roll and pitch control systems for guided missiles has been the prevention of oscillation or hunting in the operation of the sensitive hydraulic transfer valve mechanism forming an element of such systems. Numerous expedients have been tried, with only moderate success, for reducing this inherent oscillation-tendency sufficiently to provide a reasonably stable control, the most effective consisting in mounting a plurality of metal washers loosely on the valve stem, with the hope that the resultant friction would dissipate the excess energy and thus prevent oscillation. This was effective, but among other faults, was objectionable in that under certain conditions of acceleration of the missile the washers gripped the valve stem and partially actuated the valve, due to their inertia, thus leading to improper control of the missile.

An object of the present invention is to provide simple and effective means for reducing as far as possible such unwanted oscillation of a driven element.

A further object is to provide damping means which will not interfere with the normal operation of the mechanism controlled thereby, but will nevertheless absorb nearly completely the excess energy that would ordinarily produce oscillation or hunting.

A more specific object is to provide a damping means based on the energy absorbing properties of certain rubber-like synthetic plastic materials, for use in preventing oscillation of a sensitive hydraulic transfer valve.

Other objects and many of the attendant advantages of this invention will be appreciated readily as the same becomes understood by reference to the following detailed description, when considered in connection with the accompanying drawings, wherein:

Fig. 1 is a fragmentary elevation, partly in section along the line 1—1 of Fig. 2, of actuating means for a hydraulic transfer valve, and embodying damping means constructed in accordance with the present invention; and Fig. 2 is the corresponding plan.

Referring to both figures, but first more particularly to Fig. 1, a motor 10 having a shaft 11 is shown as the drive means. While ordinarily the motor shaft would rotate continuously in one direction or the other, in the present case the said shaft can make only a fractional turn, due to the auxiliary mechanism that will now be described.

An extension 12 having a bore 13 is engaged over the motor shaft 11 and secured by any suitable means, such as the headless set screws 14 illustrated. The extension has, beyond the bore 13, a transverse slot that forms an inverted V-bottom having the faces 15 and 16. Above the apex of the V, a pin 17 is inserted in a bore 18 that extends on both sides of the slot.

A bar 19 is mounted on said pin 17 for pivotal movement through a range determined by engagement of the under surface of said bar with the respective faces 15 and 16 of the bottom of the notch. Thus the bar 19 is caused to reciprocate through a distance determined by said range, when the shaft 11 rocks. The bar 19 in turn serves to reciprocate the stem 20 of the hydraulic transfer valve 21, to which it is secured by a wire link 23 that provides a slight amount of flexible yield, to compensate for the fact that the reciprocatory motion of the bar is not strictly linear but has a slight transverse deviation due to the arcuate path of the pin 17. The bar 19 has at one end a clamping head or chuck 24 provided with a set screw 26 for holding the wire 23, and a similar set screw 27 is provided on the valve stem 20 to clamp the other end of said wire.

The structure so far described suffices to actuate the transfer valve but lacks the damping feature, which constitutes the present invention and which will now be described.

Upon a suitable base 28, which conveniently supports the motor 10 and the valve 21, is mounted a block 29 having two longitudinal bores 30 therein, to receive the screws or bolts 31. The base 28 has slots 32 and 33 therein and the bolts 31 pass through said slots. Each bolt has a washer 34 and nut 35 thereon, as shown. A cross piece 36 fits over the upper end of the block 29, and has correspondingly located holes, to receive the bolts 31.

The outer end of the shaft extension 12 is cut away to substantially a diametral plane 37 and the reduced portion thus formed has a threaded bore 38 to receive a screw 39. One or more flat strips 40 and 41 of plastic, yieldable, rubber-like material are clamped at one end to the surface 37 by means for the screw 39 and a suitable washer 42, and are also held at an intermediate point between the cross piece 36 and the upper surface of the block 29 by means of the bolts 31. A suitable material for the strips 40 and 41 is that known as Vinylite, although mention of this particular material is not to exclude the possibility of using other substances having equivalent properties for the present purpose. A little experimentation with various thicknesses, widths and active lengths of the plastic materials will usually be requisite, the provide just the right amount of damping for any given installation. The active length may be adjusted by suitably shifting the block 29 along the slots 32 and 33, whereupon the bolts 31 may be secured by the nuts 35.

The operation will be clear from the structure illustrated, but may be summarized briefly as follows:

When an electrical control impulse is supplied to the motor 10, it will rock the shaft 11 in a direction dependent on the polarity of the impulse, and to an angular extent determined by the intensity of said impulse. The valve stem 20 will thus be reciprocated accordingly. When properly adjusted the Vinylite strips 40 and 41 will provide the correct amount of damping to allow the valve 21 to respond promptly but yet without overshooting, thus effectively preventing hunting or oscillation.

Obviously many modifications and variations of the present invention are possible in the light of the above teachings. It is therefore to be understood that within the scope of the appended claims the invention may be practiced otherwise than as specifically described.

What is claimed is:

1. A valve actuating mechanism for producing accurate valve control, comprising a selective directional motor, a rock shaft actuated by said motor, an oscillatory driving pin on said shaft, a pitman driven by said oscillator driving pin, a valve operating member reciprocally operated by said pitman, a strip of yieldable plastic fixed in substantially axial alignment with said rock shaft, and means for rigidly securing said strip at a point separated from the end of the shaft whereby rotation of said shaft will torsionally distort said plastic strip.

2. The arrangement set forth in claim 1 with additionally, means for adjusting the distance between the end of the shaft and the point of securement of the plastic strips to vary the torsional resistance of said strips.

RICHARD W. COLE.

References Cited in the file of this patent

UNITED STATES PATENTS

| Number | Name | Date |
|--------|------|------|
| 992,134 | Kelly | May 9, 1911 |
| 2,000,739 | Bristol | May 7, 1935 |
| 2,117,800 | Harrison | May 17, 1938 |
| 2,149,216 | Gravley | Feb. 28, 1939 |
| 2,241,837 | Williams | May 13, 1941 |
| 2,289,643 | Furnas | July 14, 1942 |
| 2,503,563 | Ray | Apr. 11, 1950 |